(12) United States Patent
Finkler

(10) Patent No.: US 7,692,397 B2
(45) Date of Patent: Apr. 6, 2010

(54) MOTOR CONTROL DEVICE AND CORRESPONDING CONTROL METHOD

(75) Inventor: Roland Finkler, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 252 days.

(21) Appl. No.: 10/599,679

(22) PCT Filed: Mar. 16, 2005

(86) PCT No.: PCT/EP2005/051221

§ 371 (c)(1),
(2), (4) Date: Aug. 7, 2007

(87) PCT Pub. No.: WO2005/098555

PCT Pub. Date: Oct. 20, 2005

(65) Prior Publication Data

US 2008/0042609 A1 Feb. 21, 2008

(30) Foreign Application Priority Data

Apr. 5, 2004 (DE) .................. 10 2004 016 733

(51) Int. Cl.
*G05B 11/42* (2006.01)
*G05D 3/14* (2006.01)

(52) U.S. Cl. .................. 318/611; 318/610; 318/637; 318/717

(58) Field of Classification Search .................. 318/254, 318/653, 657, 609, 610, 611, 717, 637; 701/41
See application file for complete search history.

(56) References Cited

U.S. PATENT DOCUMENTS

| | | | |
|---|---|---|---|
| 3,535,496 A | 10/1970 | Balcke | |
| 4,533,991 A | 8/1985 | Georgis | |
| 5,087,866 A * | 2/1992 | Smith | .................. 318/653 |
| 5,694,016 A | 12/1997 | Heinkel | |
| 5,764,017 A | 6/1998 | Bauck | |
| 6,236,925 B1 * | 5/2001 | Gierling et al. | .................. 701/53 |
| 6,954,050 B2 * | 10/2005 | Tobari et al. | .................. 318/717 |
| 7,117,186 B2 * | 10/2006 | Koza et al. | .................. 706/13 |

(Continued)

FOREIGN PATENT DOCUMENTS

DE  259 288  11/1988

(Continued)

OTHER PUBLICATIONS

"Verbesserte Erfassung von Lage und Geschwindigkeit an Hochgeschwindigkeits-spindeln" von Roland Kirchberger, Lageregelseminar 2001, Oct. 26 and 27, 2001, Stuttgart, pp. 1-28.

*Primary Examiner*—Paul Ip
(74) *Attorney, Agent, or Firm*—Henry M. Feiereisen; Ursula B. Day

(57) ABSTRACT

The aim of the invention is to provide a speed control method for reducing current ripple and speed ripple at constant dynamics behavior while reducing the hardware required to a minimum. For this purpose, a control signal, especially a speed deviation (ev) is divided up into at least two signal portions (evhi and evlo). Every one of the at least two signal portions (evhi and evlo) is processed in a different manner. The low-order portion (evlo) can be smoothed by means of a low-pass filter (F). In an adder (Sum6) mounted downstream thereof the differently processed signal portions are then added up for further control.

14 Claims, 4 Drawing Sheets

U.S. PATENT DOCUMENTS

2004/0207358 A1* 10/2004 Tobari et al. ................ 318/717
2006/0069481 A1* 3/2006 Kubota et al. ................ 701/41

FOREIGN PATENT DOCUMENTS

| DE | 40 15 682 | 11/1990 |
| DE | 100 24 394 | 11/2001 |
| EP | 0 398 368 | 11/1990 |

* cited by examiner

MOTOR CONTROL DEVICE AND CORRESPONDING CONTROL METHOD

BACKGROUND OF THE INVENTION

The present invention relates to a motor control device having a control component for making available a control signal. Furthermore, the present invention relates to a corresponding control method.

The speed control or rotational speed control and also the position control of drives is frequently adversely affected by noise and other interference variables. This problem is explained in more detail with reference to the speed control circuit for linear drives which is illustrated in FIG. 1. A reference speed vref is predefined for the control circuit. In an adder Sum1, an actual speed vist is subtracted from this reference speed vref so that a difference or differential signal ev is obtained. The differential signal ev is amplified proportionally with the gain factor Kp in an amplifier G1. In the amplifier G2, integrator I1 and adder Sum2 which are connected downstream, an I component with an adjustment time Tn is taken into account. A current i which results from the adder Sum2 is converted into a linear position x by a motor M which constitutes the controlled system. Here, the motor M is modeled by an amplifier G3 and two integrators a2v and v2x connected downstream. The amplifier G3 converts the current i into an acceleration a in accordance with a force constant KF. Said acceleration a is converted in the first integrator a2v into a speed v and subsequently into a position x in the second integrator v2x.

A signal transmitter G taps the position x, an interference signal rx being unintentionally added to the position signal x, which is indicated by the adder Sum3. The interference signal rx is produced, for example, by quantization noise or other noise and other interference variables. The signal transmitter G thus supplies an actual position signal xist.

The signal transmitter evaluation unit A in the feedback branch serves to convert the actual position signal xist into the actual speed signal vist. To do this, differentiation which is discrete over time is carried out with the delay element D1, the adder Sum4 and the amplifier G4. The blocks D1, Sum4, G4, vref, Sum1, G1, G2, I1, Sum2 usually operate in this context in a discrete fashion overtime, the clock rate corresponding to the delay T of the delay element D1. Correspondingly, the actual position signal xist is not continuous either but rather is sensed in a discrete fashion over time with this clock rate. To this extent, the signal transmitter evaluation A forms the difference between the current and preceding actual positions which is weighted with a factor (the factor here is 1/T here).

The aim is usually to obtain the highest possible dynamics. i.e. (1) the speed v responds to changes in the reference speed vref as quickly as possible, and (2) sudden interference forces which in FIG. 1 would correspond to an additional additive component in the acceleration a which is not indicated there are as far as possible only to have a brief effect on the speed v. In order to obtain the highest possible dynamics, the aim is to implement the highest possible values for Kp in the amplifier G1 and 1/Tn in the amplifier G2 of the controller R. However, in practice there are limits on this, inter alia because the interference variable rx falsifies the actual value vist of the rotational speed. That is to say even if the true speed v corresponds to the reference value vref, the actual value vist which is determined generally differs from vref, which, when Kp is too high, gives rise to excessive motor currents i and, consequently, leads both to additional heating and generation of noise and also to excessive acceleration values a and also to the speed value v deviating from the reference value vref. In this way, even when vref is constant, an undesired additional noise-like variation occurs both in the current i and in the speed v. In the case of the current i, this variation is referred to as current ripple, and in the case of the speed v it is referred to as speed ripple.

The objective is then to carry out a modification to the effect that current ripple and speed ripple can be reduced for given dynamics and conversely the control can be made more dynamic (by increasing Kp and, if appropriate, 1/rn) without at the same time increasing the current ripple and the speed ripple.

A known modification of the control circuit illustrated in FIG. 1 comprises filtering the actual value of the speed according to FIG. 2. Here, the actual value of the speed vist is smoothed by a low pass filter TP before it is fed into the adder Sum1. However, a disadvantage of this solution is that the low pass filter TP limits the achievable dynamics.

A further possible way of minimizing the current ripple and the speed ripple is to reduce the interference signal rx. For example a higher resolution signal transmitter for the position x is suitable for this. The higher resolution signal transmitter permits the quantization noise to be reduced. The disadvantage of a signal transmitter with higher resolution is however the higher costs.

Furthermore, the interference signal rx can be reduced, for example, by oversampling, as has been described in the paper by Roland Kirchberger "Verbesserte Erfassung von Lage und Geschwindigkeit an Hochgeschwindigkeitsspindeln" (Improved sensing of position and speed on high speed spindles]", Lageregelseminar [Position control seminar] 2001, 26-27, Oct. 2001, Stuttgart. However, the greater degree of expenditure on hardware and the delay in the actual value of the speed vist compared to the true value v are disadvantageous here.

Using an additional acceleration sensor as is provided in the document DE 100 24 394 A1 allows the adverse effects of the interference variable rx on the actual speed vist and thus on the current ripple and the speed ripple to be likewise reduced. However, the additional expenditure on the acceleration sensor and its evaluation are disadvantageous here.

SUMMARY OF THE INVENTION

The object of the present invention is thus to reduce the current ripple and the speed ripple for constant dynamics of the control system and at the same time to keep the expenditure on hardware as low as possible.

According to the invention, this object is achieved by means of a motor control device having a control component for making available a control signal, a signal dividing device for dividing the control signal into at least two signal portions, a signal processing device with which each of the at least two signal portions can be processed in different ways, and an adder device for adding the differently processed signal portions for further processing.

Furthermore, according to the invention a method is provided for controlling a motor by making available a control signal, dividing the control signal into at least two signal portions, processing each of the at least two signal portions in different ways and adding the differently processed signal portions for further processing.

By splitting a control signal, in particular the speed difference into at least two portions, it is possible to feed these portions to different controllers. Compared to the prior art with filtering of the actual value of the speed corresponding to FIG. 2, the advantage is thus that according to the present invention the filtering is not applied to the entire control error but rather only to the portion for which the filtering owing to the interference variable is required.

One of the split-off signal portions is preferably a higher value signal portion and the other a lower value signal portion with respect to the signal range. This has the advantage that specifically the lower value signal portions, which are primarily changed by noise and interference variables, can be handled in a particular way. It is thus favorable if the signal processing device in the signal path for the lower value signal portion has a low pass filter. This allows high-frequency interference portions to be removed from the total signal.

Furthermore, the signal processing device can have one or more band stops in the signal path for the lower value signal portion. As a result, frequency bands which are caused by interference can be filtered out of the signal in a selective fashion.

In a further developed motor control device it is possible to provide not only a position sensor but also an acceleration sensor for sensing the movement of an adjustment element so that a corresponding actual variable can be acquired. This parallel sensing of an actual value allows the interference portions in the actual speed vist to be minimized by virtue of the fact that this actual speed vist is not determined as in FIG. 1 but rather, for example, as described in DE 100 24 394 A1.

Furthermore, in the motor control device according to the invention or for the corresponding method it is possible to provide a sampling device for repeatedly sampling a variable to be sensed within a time step with the acquisition of a plurality of sampled values and for supplying an averaged sampled value in the time step as an actual variable. In this way it is possible to ensure oversampling of the signal to be sampled and to bring about a corresponding reduction in the interference signal rx. The control component which is provided in the motor control device according to the invention may be a subtraction device for subtracting an actual variable from a reference variable by making available a differential signal, the signal dividing device for dividing the differential signal being connected downstream of the subtraction device. Alternatively, the splitting can also take place in the feedback branch upstream of the subtraction device. If intervention into the controller R does not constitute a disadvantage compared to intervention in the signal transmitter evaluation A, this alternative does not provide any advantage over the original solution. However, on the other hand, this solution is advantageous in particular if preferably the case vref=0 is of interest or the interference signal rx is caused essentially by quantization noise and it is ensured that vref always assumes possible quantization steps of vist.

BRIEF DESCRIPTION OF THE DRAWING

The present invention is explained in more detail with reference to the appended drawings, in which.

DETAILED DESCRIPTION OF PREFERRED EMBODIMENTS

The exemplary embodiments which are explained in more detail below constitute preferred embodiments of the present invention.

Figure 1:
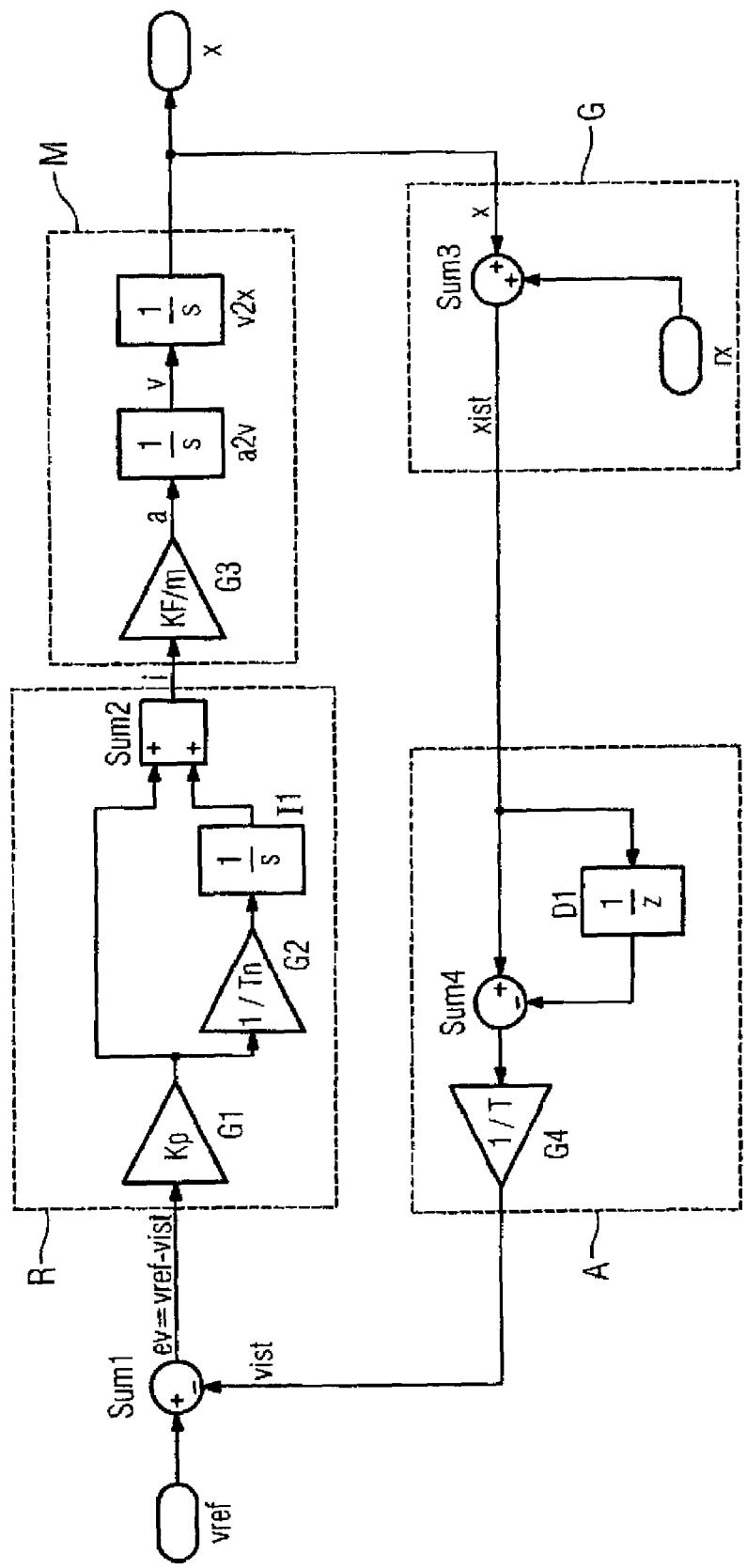
FIG. 1 shows a speed control circuit corresponding to the prior art.
Figure 3:
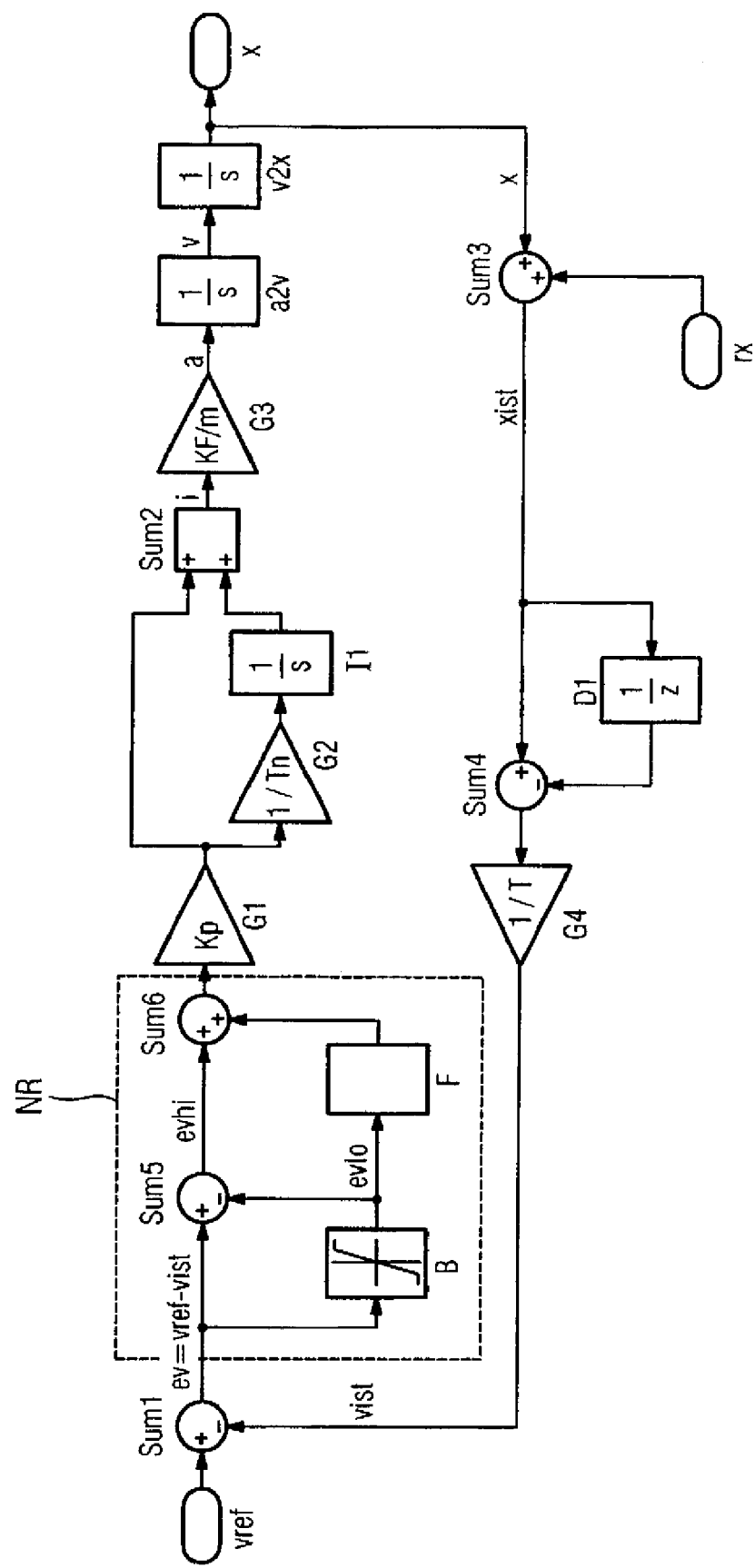
FIG. 3 shows a speed control circuit with division of the signal in accordance with the present invention.

The speed control system according to the invention which is shown in FIG. 3 is composed essentially of the components which have already been presented in conjunction with FIG. 1. However, a nonlinear controller NR is connected upstream of the controller R described in FIG. 1. In said controller NR the speed difference ev is divided into two portions, as is also possible in a similar way in the case of a binary number with the splitting into higher order bits and lower order bits. In the example shown in FIG. 3, however, the the speed difference ev is split into a higher value portion evhi and a lower value portion evlo where evhi+evlo=ev.

In the example shown in FIG. 3, the lower value portion evlo corresponds approximately to the signal level which is caused by the interference variable rx. The higher value portion is processed as in the prior art according to FIG. 1, while the lower value portion is, for example, a) prefiltered or b) fed only to the I element. This is possible since the interference variable rx is free of mean values. For example a) a block circuit diagram is specified in FIG. 3.

The signal output of the adder Sum1 is split into two signal paths. A limiter B is arranged in one of the signal paths. Said limiter limits the signal range corresponding to a desired saturation function, for example $$evlo = \begin{cases} -Q \text{ for } ev < -Q \\ ev \text{ for } -Q \leq ev \leq Q \\ Q \text{ for } Q < ev \end{cases}$$

with a positive constant Q. The resulting signal evlo comprises only the lower value portions of the original signal ev. In an adder Sum5, the signal portion evlo is subtracted from the original signal ev, resulting in the higher value signal portion evhi. The higher value signal portion, which originates, for example, from a load change of the motor and thus corresponds to an actual change in the speed v, is fed in an unprocessed form to an adder Sum6. The lower value signal portions evlo are, on the other hand, filtered in a filter F before they are fed to the adder Sum6. The two signal portions are added again to form a common signal in the adder Sum6, and are fed to the controller R or its amplifier G1.

Figure 2:
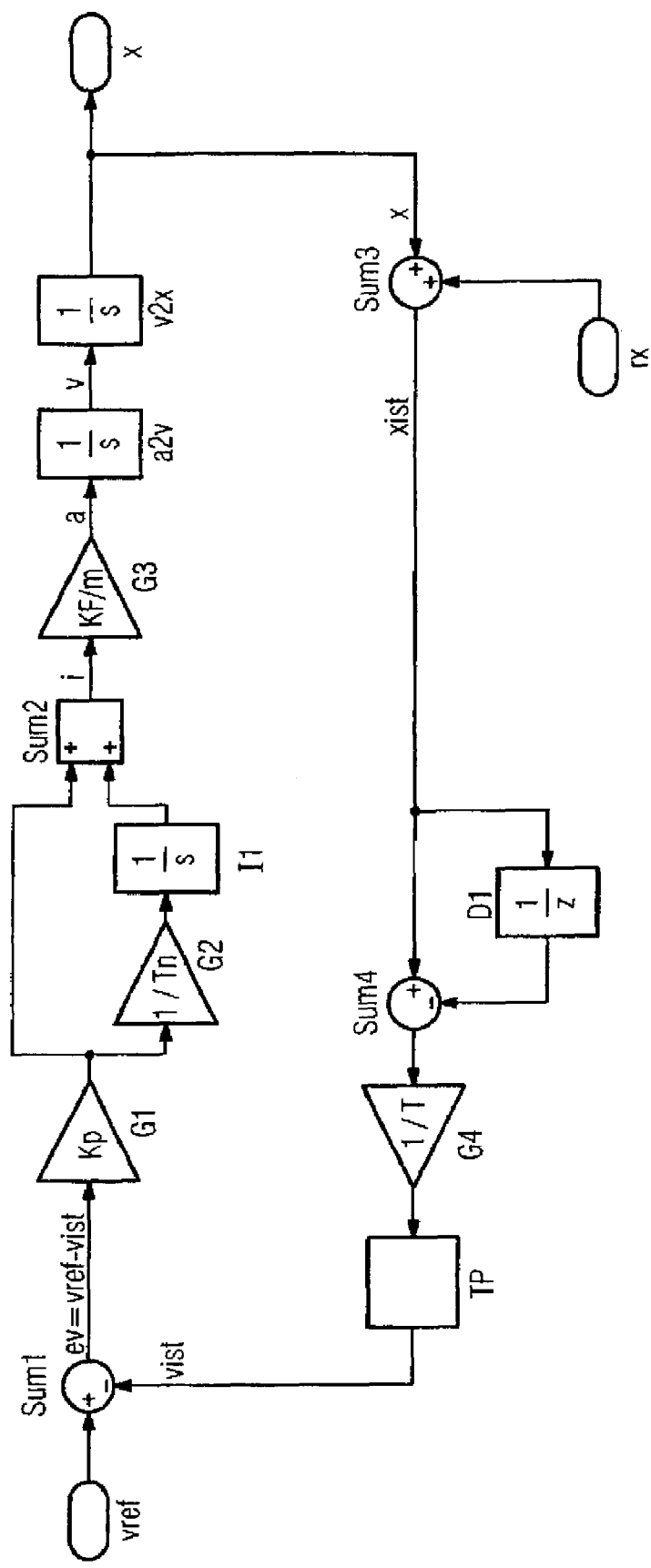
FIG. 2 shows a speed control circuit with filtering of the actual value of the speed corresponding to the prior art.

The limiter B ensures that the range of the lower value portion evlo corresponds approximately to the range of the signal portion of the actual speed signal vist that is contributed by the interference signal rx. For example the low pass filter TP from FIG. 2 can be used for the filter. In this case, the smoothing of the actual value of the speed or rotational speed is effective only for the signal portion for which it is actually also required. Alternatively or additionally, one or more band stops with an adjustable stop frequency can be implemented in the filter F. For example, their stop frequency or frequencies being can be adjusted in such a way that it corresponds to an integral multiple of the frequency of marks on the signal transmitter whose signal transmitter wheel has a predetermined number of marks to be sampled. In fact the actual value of the speed vist often has considerable interference portions at such frequencies.

Basically, it is also possible for the signal of the speed difference ev to be divided into more than two portions and for the nonlinear control in these portions to be carried out individually. Furthermore, it is also possible, as has already been mentioned above, to use an acceleration sensor in parallel with the position sensor in order to suppress noise or interference portions. In addition the signal transmitter G can also permit oversampling.

The nonlinear control step can also be carried out between the signal transmitter evaluation unit A and the adder unit Sum1 for the actual speed signal visit instead of before the control process R. Although this alternative is less advantageous, it is appropriate in existing control circuits in which, for example, only the actual speed signal vist is accessible.

Figure 4:
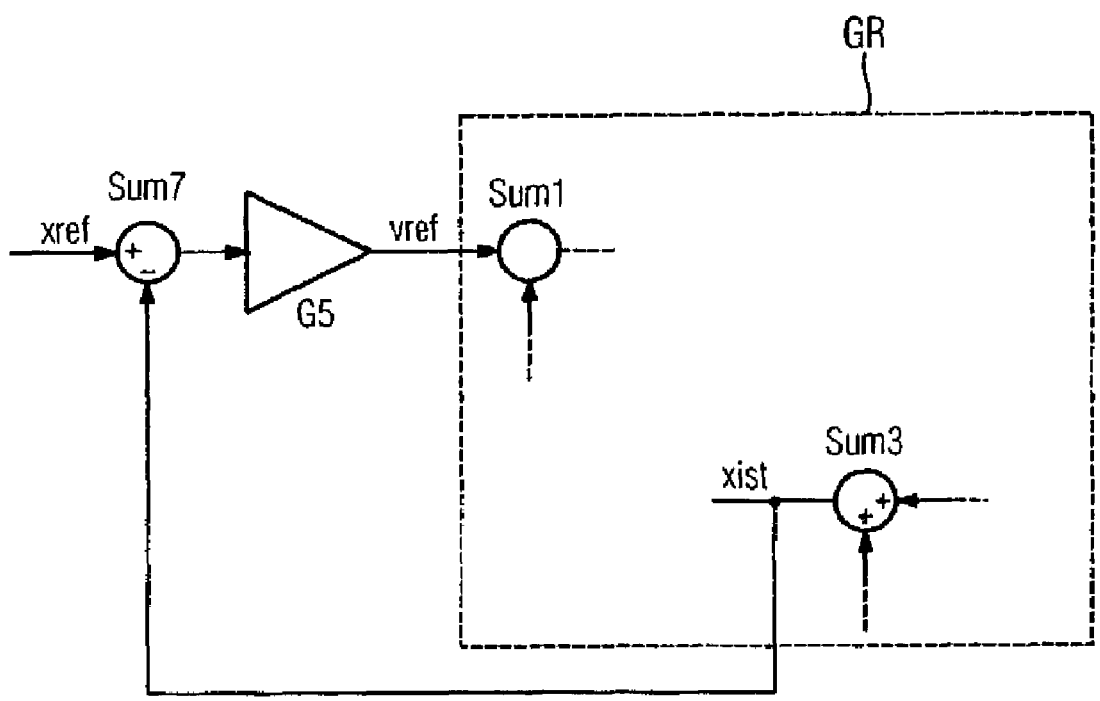
FIG. 4 is a block circuit diagram of a position control system according to the invention.

The control mechanism according to the invention can also be used for position control. This position control can be built up in a customary way without conversion into speed signals. However, alternatively it can also be implemented by utilizing the speed control system from FIG. 3. A corresponding block circuit diagram is represented in FIG. 4, the speed control circuit from FIG. 3 being indicated by the dashed rectangle GR. The actual position signal for the position control is fed to an adder Sum7 which subtracts this signal from a reference position value xret. The subsequent amplifier G5 converts the position difference signal into the speed reference value vref. In this context, a nonlinear controller of the type of the nonlinear controller NR from FIG. 3 can alternatively be connected between the output of the adder Sum7 and the input of the amplifier G5. As a result, the control circuit from FIG. 3 can be used both for controlling speed and for controlling position.

What is claimed is:

1. A motor control device, comprising:
   a control component adapted to provide a control signal;
   a signal dividing device adapted to divide the control signal into at least two signal portions, one of the control signal portions being a higher value signal portion and the other one of the control signal portions being a lower value signal portion;
   at least one signal processing device adapted to process each of the at least two control signal portions in different ways; and
   an adder device adapted to add together the differently processed control signal portions before further processing.

2. The motor control device of claim 1, wherein the at least one signal processing device includes a low pass filter which is connected in a signal path for the lower value signal portion.

3. The motor control device of claim 1, wherein the at least one signal processing device includes at least one band stop filter which is connected in a signal path for the lower value signal portion.

4. The motor control device of claim 1, further comprising a position sensor for sensing a movement of an adjustment element; and an acceleration sensor for sensing a movement of the adjustment element.

5. The motor control device of claim 1, further comprising a sampling device adapted to repeatedly sample a variable to be sensed within a time step so as to acquire a plurality of sampled values for the time step, said sampling device being adapted to supply an average of the sampled values acquired for the time step as an actual variable.

6. The motor control device of claim 1, wherein the control component includes a subtraction device for providing a differential signal by subtracting an actual variable from a reference variable, said signal dividing device being connected downstream of the subtraction device.

7. The motor control device of claim 1 wherein the signal processing device is adapted to process the higher value signal portion to producing an I-component and the adder device is adapted to add the lower-value signal portion to said I-component.

8. A method for controlling a motor, comprising the steps of:
   providing a control signal;
   dividing the control signal into at least two control signal portions, one of the control signal portions having a higher value signal portion and another one of the control signal portions having a lower value signal portion;
   processing each of the at least two control signal portions in different ways; and
   adding the differently processed control signal portions together before further processing.

9. The method of claim 8, further comprising the step of filtering the lower value signal portion with a low pass filter.

10. The method of claim 8, further comprising the step of filtering the lower value signal portion with at least one band stop filter.

11. The method of claim 8, further comprising the steps of sensing a position signal; providing the position signal as an actual variable; sensing an acceleration signal; and providing the acceleration signal as an actual variable.

12. The method of claim 8, further comprising the steps of repeatedly sampling a variable which is to be sensed within a time step so as to acquire a plurality of sampled values for the time step, and providing an average of the values acquired for the time step as an actual variable.

13. The method of claim 8, wherein the providing step includes the step of subtracting an actual variable from a reference variable to produce a differential signal, said differential signal representing the control signal that is divided into the at least two control signal portions.

14. The method of claim 8 wherein the high-value signal portion is processed to produce an I-component, wherein the lower-value signal portion is added to the I-component.

* * * * *